June 22, 1965
E. E. FRENCH
3,190,782
TIRE STITCHER
Filed June 7, 1963
2 Sheets-Sheet 2
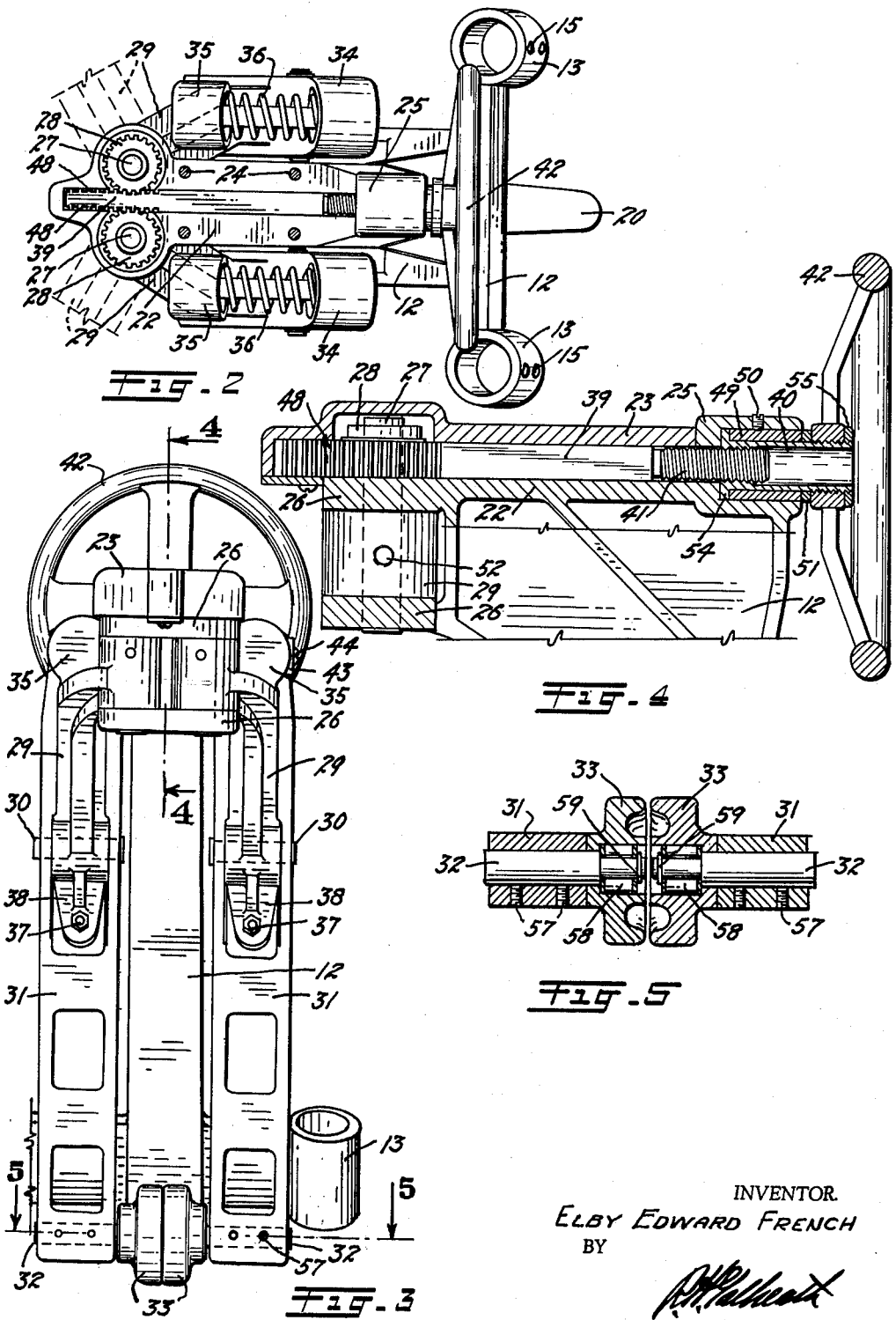
INVENTOR.
ELBY EDWARD FRENCH
BY
ATTORNEY 3,190,782
TIRE STITCHER
Elby Edward French, Littleton, Colo., assignor to O.K. Tire and Rubber Co., Littleton, Colo., a corporation of Colorado
Filed June 7, 1963, Ser. No. 286,337
10 Claims. (Cl. 156—410)

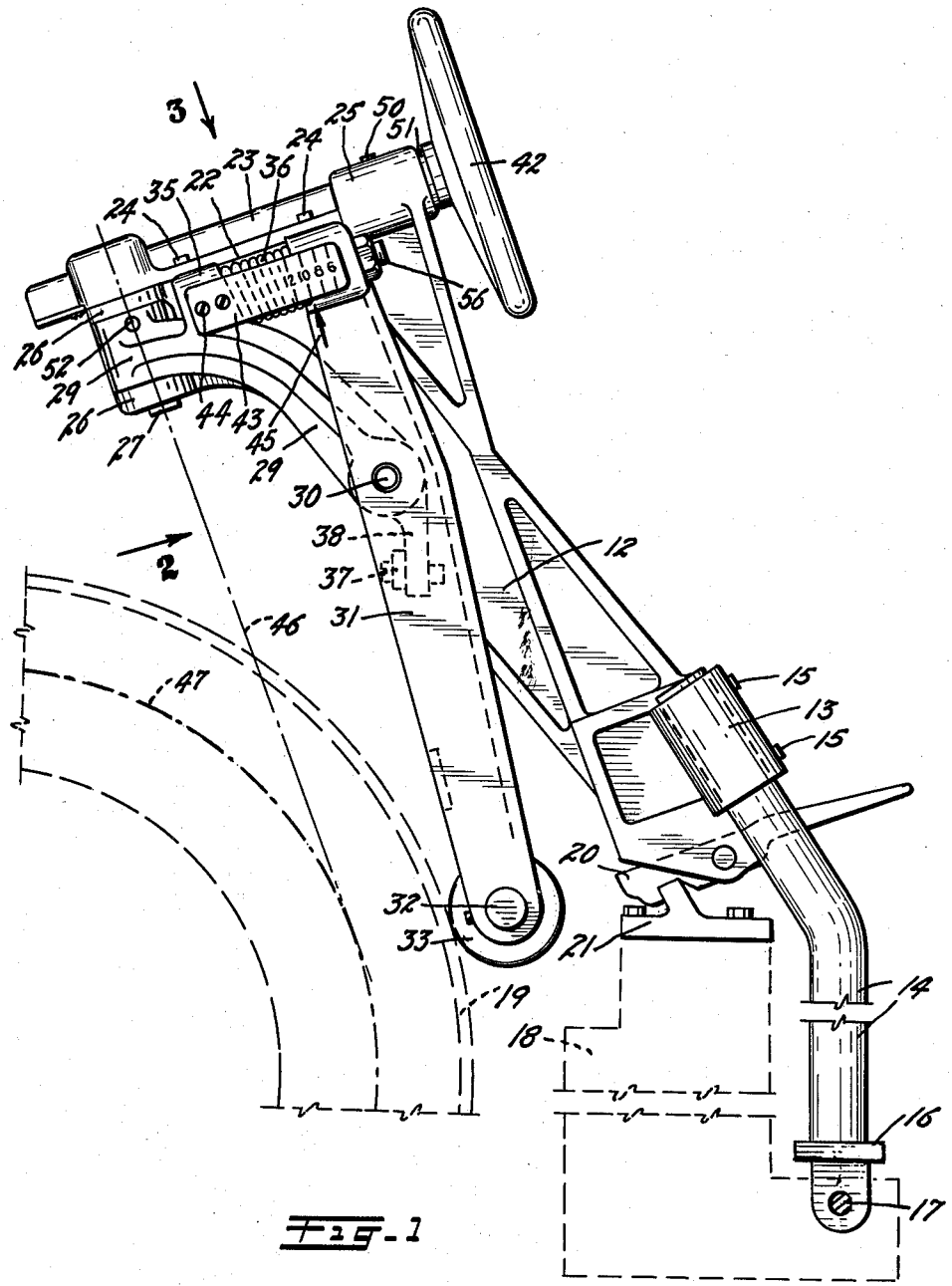

This invention relates to tire building and retreading machines and more particularly to a stitcher for mounting on a tire retreading machine for rolling the raw rubber strip or camel-back upon a stripped and prepared tire carcass.

The principal object of the invention is to provide a unitary and highly efficient stitcher for a tire retreading machine which will roll the camel-back smoothly and intimately onto the carcass and which will apply the stitching simultaneously outward with uniform pressure on both sides of the center-line of the tread of the tire so as to maintain the retread accurately centered throughout the entire stitching operation.

Another object of the invention is to provide a stitcher which in one continuous operation will simultaneously roll the camel-back upon both sides of the tread, thence inwardly and about both shoulders, and thence inwardly against both side walls of the carcass so that a continuous and progressive kneading action from beginning to end is maintained to eliminate all air pockets and produce a retread of uniform thickness, both laterally and longitudinally, throughout the entire circumference of the tire.

A further object is to provide a stitcher which can be quickly and easily applied to or adjacent to any of the conventional tire retreading machines for efficient application of the uncured tread rubber.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a side view of the improved stitcher;

FIG. 2 is a front view thereof looking in the direction of the arrow "2" in FIG. 1;

FIG. 3 is a top view, looking in the direction of the arrow "3" in FIG. 1, with a top cover plate removed to expose a rack bar to be later described;

FIG. 4 is an enlarged fragmentary detail section taken on the line 4—4, FIG. 3; and FIG. 5 is a similarly enlarged detail section taken on the line 5—5, FIG. 3.

The improved stitcher is designed to be mounted on any conventional retreading machine, such as indicated in broken line at 18, of the type having means for mounting and rotating a tire carcass, such as indicated in broken line at 19.

The improved stitcher employ a cast main frame 12 formed with two inclined mounting sleeves 13 at its lower extremity which are locked onto two tubular, pivoted, supporting arms 14 by means of suitable set screws 15. As illustrated, the supporting arms are welded to a mounting bar 16 which is pivoted, by means of a suitable pivot pin 17, to the retreading machine 18 in any suitable manner, depending upon the construction of the latter machine. The pivotal mounting of the supporting arms could be wherever and however convenient so as to allow the arms 14 and the main frame 12 to be swung forwardly toward or rearwardly away from the rotating tire carcass 19. A pivoted latch member 20 is mounted on the bottom of the main frame 12 so as to engage a keeper 21 which is secured to the machine 18, in any desired manner, to retain the main frame in its foremost position when the stitcher is in use.

The upper extremity of the main frame 12 terminates in a horizontal frame pad 22 over which a cover plate 23 is detachably mounted by means of suitable cap screws 24. A rear, horizontal-axis bearing sleeve 25 is formed on the upper extremity of the main frame 12 at the rear of, and in axial alignment with, the pad 22. A pair of vertically-aligned, vertical-axis bearing sleeves 26 are formed on the frame member 12 at each side of the forward extremity of the pad 22.

A pinion shaft 27, extending downwardly from a toothed pinion 28 resting on the frame pad 22, is rotatably mounted in each pair of vertical-axis bearing sleeves 26. The pinions are fixedly locked on their respective shafts by means of key pins 52. A pivot arm 29 is mounted at its upper extremity on each pinion shaft 27 intermediate the bearing sleeves 26 and is keyed thereto by means of a key pin 52. The pivot arms 29 extend outwardly and downwardly at each side of the forward extremity of the main frame 12 and each terminates in a pivot pin 30. The position of the pivot pins 30 and the contour of the arms 29 are such that when the arms are swung rearwardly against each side of the main frame member 21 the pivot pins 30 will horizontally and axially align with each other.

A roller lever 31 is pivotally mounted intermediate its extremities on each pivot pin 30. The roller levers have a hollow channel cross section and the arms 29 are mounted on their respective pivot pins within the hollow cross section of the roller levers and extend both upwardly and downwardly from the pins. Each roller lever terminates at its lower extremity in a roller shaft 32 upon which a stitching roller 33 is rotatably mounted. The axes of the stitching roller shafts 32 lie in the plane of and are parallel to the axes of the pivot pins 30.

The upper extremity of each roller lever 31 terminates in a spring cup 34 and a similar spring cup 35 is formed on each of the pivot arms 29 in alignment with the first cup 34. A compression spring 36 is seated at its extremities in the cups 34 and 35 at each side of the stitcher and extends therebetween to constantly and independently urge the lower extremities of the roller levers 31 forwardly to resiliently force the rollers 33 against the tire carcass 19, as shown in FIG. 1. The maximum forward movement of the lower extremity of each roller lever 51 is limited by an adjustable limit screw 37 mounted in a limit lug 38 formed on the lower extremity of each pivot arm against which the roller lever contacts to limit the forward movement of the rollers 33.

The circumferences of the two pinions 28 are spaced apart and a toothed rack bar 39 of substantially square cross section is positioned therebetween. The rack bar is provided with rack teeth 48 in its opposite sides which mesh with the teeth of the two pinions 28 so that when the rack bar is drawn rearwardly, it will simultaneously rotate both pinions to cause the two pivot arms 29 to swing simultaneously outward in unison.

The rear extremity of the rack bar is cylindrical and the cylindrical portion is provided with external threads 41 which are threaded into an internally threaded, cylindrical feed nut member 40 which is rotatably maintained in the bearing sleeve 25 by means of bearing bushing 49 which is locked in the sleeve 25 by suitable set screws 50 and which acts against a forward retaining flange 54 on the feed nut member to prevent withdrawal of the latter. The feed nut member is rotated by means of a hand wheel 42 which is keyed on the rear extremity of the feed nut member and which is retained in place by means of a retaining nut 55. A thrust washer 51 allows relative rotation between the hand wheel 42 and the bearing bushing 49. It can be seen that the feed nut member will rotate in unison with the hand wheel 42 and since the former is threaded on the rack bar 39, the latter will be reciprocated forward and back. The rack bar 39 and the pinions 28 are normally covered and retained in place by the cover plate 23.

Operation

Let us assume that a stripped, prepared tire carcass is in place in the machine 18 as indicated in broken line at 19 in FIG. 1, and that the carcass is rotating rearwardly from the operator. The handwheel is now gripped and the entire stitcher is swung forwardly about the axis of the pivot 17. As the stitcher approaches its working position, the forward movement of the rollers 33 will be stopped when they contact the carcass. The remaining forward movement of the stitcher causes the upper extremities of the roller levers 31 to swing forwardly compressing the springs 36 so that when the latch member 20 finally locks to the keeper 21, the rollers will be pressing side by side against the tread of the carcass with predetermined resilient pressure under the bias of the two springs 22.

The operator now cements the starting extremity of the camel-back to the carcass tread on the center line of the latter so that it will travel beneath the press rollers 33 to be rolled into intimate contact with the center tread portion of the carcass. When the complete circumference has been covered, the camel-back is severed to place the final extremity into bonding contact with the starting extremity as is usual in retreading work.

The carcass is now continuously rotated rearwardly beneath the press rollers 33 while the hand wheel 42 is slowly rotated to draw the rack bar 39 rearwardly so as to cause the press rollers to travel oppositely outward and forward about the center line of the carcass to resiliently roll the camel-back over the shoulders of the carcass thence inwardly on the two side walls toward the bead of the tire.

The pressure being applied by the press rollers can be preadjusted by means of spring-adjusting screws 56. The pressure being applied is indicated on a gauge plate 43 secured, by means of suitable screws 44, to the spring cup 35 of one of the pivot arms and extending alongside the spring 22 and alongside the adjacent spring cup 34 on the roller lever 31. An index pointer 45 on the latter roller lever indicates positions on the gauge plate as the springs are compressed.

It is desired to call attention to the fact that the axial plane of the pinion shafts 27, indicated by the dot-dash line 46 tangentially intersects the circumferential center line of the tire, indicated by the arcuate dot-dash line 47 in FIG. 1 so that the rollers will accurately travel about the circumferential center line of the tire as the handwheel 42 is rotated.

The press rollers are mounted on anti-friction bearings 58 held in place on reduced extremities on the roller shafts 32 by means of snap rings 59 so that the rollers roll freely. The roller shafts are set in place by means of suitable set screws 57.

While a specific form of the invention has been described and illustrated herein, it is to be understood that the same may be varied, within the scope of the appended claims, without departing from the spirit of the invention.

Having thus described the invention, what is claimed and desired to be secured by Letters Patent is:

1. A stitcher, for a tire retreading machine of the type having means for rotating a tire carcass, comprising: a main frame member; means for mounting said main frame member so that it may be swung forwardly in the plane of and over said carcass; a pair of pivot arms, pivotally secured at their forward extremities on the forward extremity of said main frame, there being one of said pivot arms pivoted to swing rearwardly along each side of said main frame member; a roller lever pivotally mounted on each pivot arm, said pivot arms extending downwardly to a position in spaced relation to said tire carcass; a press roller mounted on the lower extremity of each pivot arm; resilient means urging said rollers into contact with said carcass; and means for simultaneously rotating said pivot arms about their pivot axes to cause said rollers to travel outwardly and forwardly about said carcass.

2. A stitcher as described in claim 1 in which the pivotal mounting of said pivot arms comprises: a pair of pinion shafts rotatably mounted in parallel relation in the forward extremity of said main frame member, one of said pivot arms being fixedly mounted on each of said pinion shafts, the plane of the axes of said pinion shafts being tangent to, and parallel to the axis of, said carcass.

3. A stitcher as described in claim 2 in which the means for simultaneously rotating said pivot arms comprises: a toothed pinion fixed on each pinion shaft in aligned and spaced-apart relation; a toothed rack bar positioned between said pinions and in mesh with both; and means for moving said rack bar longitudinally to simultaneously rotate said pinions in opposite directions.

4. A stitcher as described in claim 3 in which the means for moving the rack comprises: threads formed on said rack bar; an axially immovable nut threaded on and rotatable on said threads; and means for manually rotating said nut.

5. A stitcher as described in claim 1 in which the resilient means for urging said rollers into contact with said carcass comprises: upper portions on said roller levers extending above the pivot axis of said levers; and a compression spring interposed between the upper portion of each lever and the pivot arm to which that lever is pivoted and acting to resiliently urge the upper portion outwardly so as to urge the rollers toward said carcass.

6. A stitcher as described in claim 5 having stop means for adjustably limiting the outward movement of said upper portions.

7. A stitcher as described in claim 5 having opposed spring cups on the upper extremities of said upper portions and on said pivot arms, the extremities of said springs being supported in said cups.

8. A stitcher as described in claim 1 in which the means for mounting said main frame member comprises: vertically extending supporting arms; means for pivotally mounting the lower extremities of said arms on said machine; and means for mounting said main frame member on said arms.

9. A stitcher as described in claim 7 having latch means for locking said supporting arms in their foremost position to maintain said rollers in resilient contact with said carcass.

10. A stitcher as described in claim 9 having mounting sleeves formed on said main frame member through which supporting arms extend and means for fixedly securing said sleeves on said supporting arms.

References Cited by the Examiner

UNITED STATES PATENTS

| | | | |
|---|---|---|---|
| 1,331,657 | 2/20 | Macbeth et al. | 156—410 |
| 1,443,939 | 1/23 | Brucker | 156—410 |
| 1,728,511 | 9/29 | Scrote | 156—408 |
| 1,762,453 | 6/30 | Perrault et al. | 156—411 |
| 1,787,413 | 12/30 | Stevens | 156—410 |
| 1,859,538 | 5/32 | Shook | 156—409 |
| 1,872,830 | 8/32 | Shook et al. | 156—409 |
| 2,814,330 | 11/57 | Vanzo et al. | 156—410 |
| 2,936,023 | 5/60 | Giletta et al. | 156—410 |

EARL M. BERGERT, *Primary Examiner.*